US008272121B2

(12) United States Patent
Beck et al.

(10) Patent No.: US 8,272,121 B2

(45) Date of Patent: Sep. 25, 2012

(54) INSERTION TOOL WITH GAS SPRING

(75) Inventors: Alan D. Beck, Bow, NH (US); John D. Lefavour, Litchfield, NH (US); Lawrence Brown, Ctr Barnstead, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/804,563

(22) Filed: Jul. 23, 2010

(65) Prior Publication Data

US 2011/0023295 A1 Feb. 3, 2011

Related U.S. Application Data

(60) Provisional application No. 61/273,073, filed on Jul. 29, 2009.

(51) Int. Cl.
*B23P 19/00* (2006.01)

(52) U.S. Cl. ................ 29/750; 29/748; 29/751; 29/755; 72/453.01; 72/453.15

(58) Field of Classification Search .................... 29/748, 29/750, 751, 755, 758; 72/453.01, 453.15
See application file for complete search history.

(56) References Cited

U.S. PATENT DOCUMENTS

| | | | | | |
|---|---|---|---|---|---|
| 3,481,373 | A * | 12/1969 | Blagojevich | | 140/113 |
| 3,588,791 | A | 6/1971 | Polidori | | 439/783 |
| 4,745,981 | A | 5/1988 | Buske | | 173/119 |
| 5,284,044 | A | 2/1994 | Bier | | 72/453.07 |
| 5,609,504 | A | 3/1997 | Cherry et al. | | 439/783 |
| 5,785,229 | A | 7/1998 | Franzini | | 227/10 |
| 5,813,301 | A | 9/1998 | Fujita | | 83/140 |
| 6,745,611 | B2 | 6/2004 | Lefavour et al. | | 72/453.16 |
| 7,410,010 | B2 | 8/2008 | Henriksson et al. | | 173/208 |
| 7,458,314 | B2 | 12/2008 | Asa et al. | | 92/165 R |
| 2008/0026644 | A1 | 1/2008 | De France et al. | | 439/783 |
| 2008/0079221 | A1 | 4/2008 | Tupper | | 277/345 |
| 2008/0287010 | A1 | 11/2008 | Copper et al. | | 439/783 |

* cited by examiner

*Primary Examiner* — Carl Arbes

(74) *Attorney, Agent, or Firm* — Harrington & Smith

(57) ABSTRACT

A connector installation apparatus including a frame, a ram and a gas spring. The frame includes an anvil section. The anvil section is adapted to have a first connector part located at the anvil section. The ram is movably connected to the frame. The ram includes a front section adapted to have a second connector part located at the front section. The gas spring includes a piston head on a rear end of the ram, and a portion of the frame forming two variable chambers with the piston head.

21 Claims, 5 Drawing Sheets

INSERTION TOOL WITH GAS SPRING

CROSS REFERENCE TO RELATED APPLICATION

This application claims the benefit under 35 USC 119(e) of provisional patent application No. 61/273,073 filed Jul. 29, 2009 which is hereby incorporated by reference in its entirety.

BACKGROUND OF THE INVENTION

1. Field of the Invention

The invention relates to tool which uses a gas spring and, more particularly, to an electrical connector installation tool.

2. Brief Description of Prior Developments

U.S. Pat. No. 5,785,229, which is hereby incorporated by reference in its entirety, describes a tool which uses a cartridge which is fired to insert a wedge into a shell of an electrical wedge connector. An adapter is described which uses a spring to propel a striker; rather than using a hammer to strike the tool. Gas springs are known to exist such as described in U.S. Pat. Nos. 7,458,314 B2 and 5,813,301 which are hereby incorporated by reference in their entireties.

SUMMARY

The following summary is merely intended to be exemplary. The summary is not intended to limit the scope of the claimed invention.

In accordance with one aspect of the invention, a connector installation apparatus is provided including a frame, a ram and a gas spring. The frame includes an anvil section. The anvil section is adapted to have a first connector part located at the anvil section. The ram is movably connected to the frame. The ram includes a front section adapted to have a second connector part located at the front section. The gas spring includes a piston head on a rear end of the ram, and a portion of the frame forming two variable chambers with the piston head.

In accordance with another aspect of the invention, a connector installation apparatus is provided comprising a frame and a ram. The frame comprises an anvil section. The anvil section is adapted to have a first connector part located at the anvil section. The ram is movably connected to the frame. The ram comprises a front section adapted to have a second connector part located at the front section. The ram comprises a piston head forming two variable chambers in the frame. A conduit and a gas flow control connect the two chambers to each other to control movement of gas between the two chambers and movement of the ram relative to the frame.

In accordance with another aspect of the invention, a method is provided comprising moving a ram of a connector installation tool from a first extended position to a second retracted position in a frame, wherein gas from a first chamber is compressed into a second chamber by a piston head of the ram; locating two connector pieces of a connector between a front end of the ram and an anvil section of the frame; and allowing the gas to move from the second chamber back to the first chamber to thereby drive the ram forward and move a first one of the connector pieces into a second one of the connector pieces.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
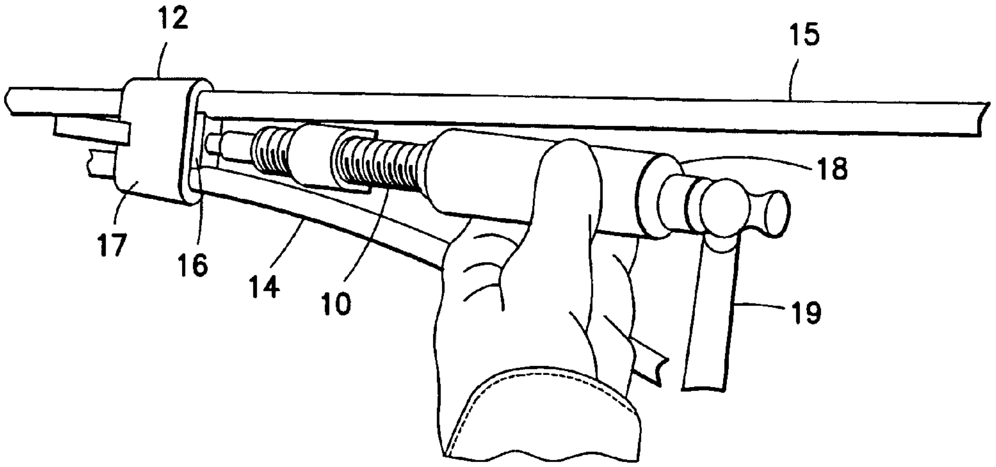
FIG.1 PRIOR ART
FIG. 1 is a perspective view illustrating a conventional connector installation tool being used to install a wedge connector and electrically and mechanically connect two electrical conductors.

Referring to FIG. 1, there is shown a perspective view of a tool 10 known in the prior art being used to install an electrical connector 12. The tool 10 is an explosively operated tool described in U.S. Pat. No. 4,722,189 which is hereby incorporated by reference in its entirety. The tool 10 is used for connecting a branch or tap wire 14 to a main power line 15. The connector 12 includes a connector wedge 16 and a C-shaped sleeve 17. The tool 10 uses a powder cartridge to drive the connector wedge 16 into the sleeve 17; sandwiching the wire 14 and line 15 against opposite ends of the sleeve 17. The tool is fired by a user striking the rear end 18 of the tool 10 with a hand-held hammer 19.

Figure 2:
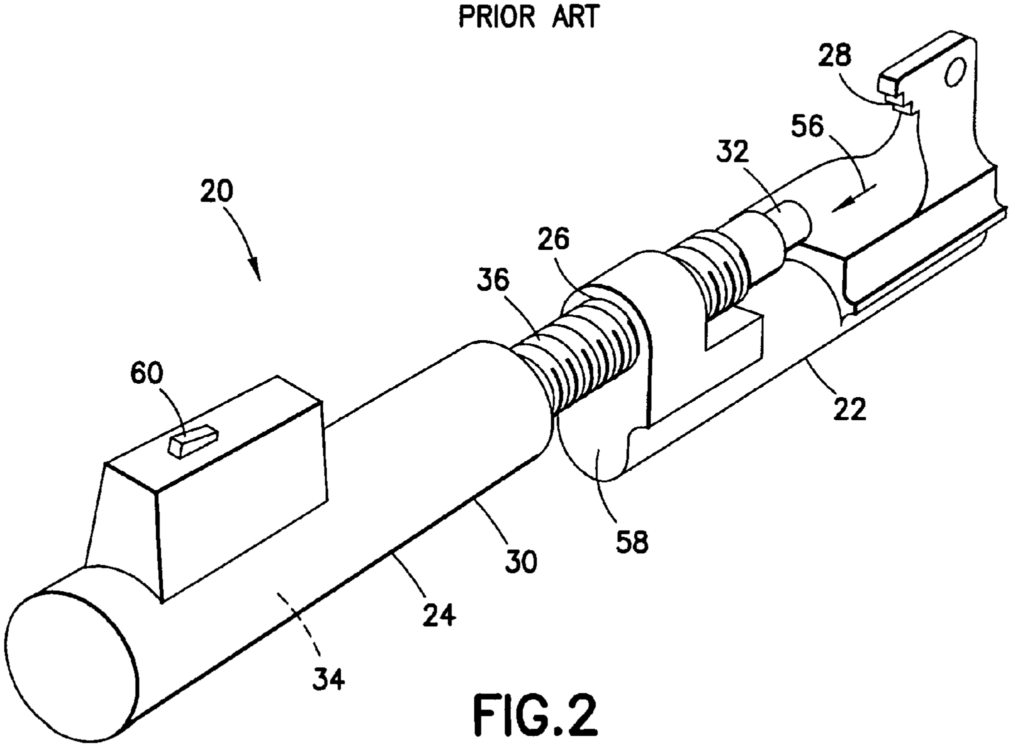
FIG. 2 is a perspective view of a connector installation apparatus comprising features of the invention.

Referring now to FIG. 2, there is shown a perspective view of a tool 20 incorporating features of the invention which is used to connect the wedge connector 12 to the conductors 14, 15 rather than the tool 10. Although the invention will be described with reference to the example embodiments shown in the drawings, it should be understood that the invention can be embodied in many alternate forms of embodiments. In addition, any suitable size, shape or type of elements or materials could be used.

The tool 20 generally comprises a first section and a second section 24. In this embodiment the second section 24 is adjustably connected to the first section 22 by a threaded or screw connection 26. However, any suitable adjustable connection could be provided. Alternatively, the connection might not be adjustable. The first section 22 is a one piece metal member having a front end forming an anvil section 28. A rear end of the first section 22 has the second section 24 adjustable connected thereto in a threaded hole.

Figure 3:
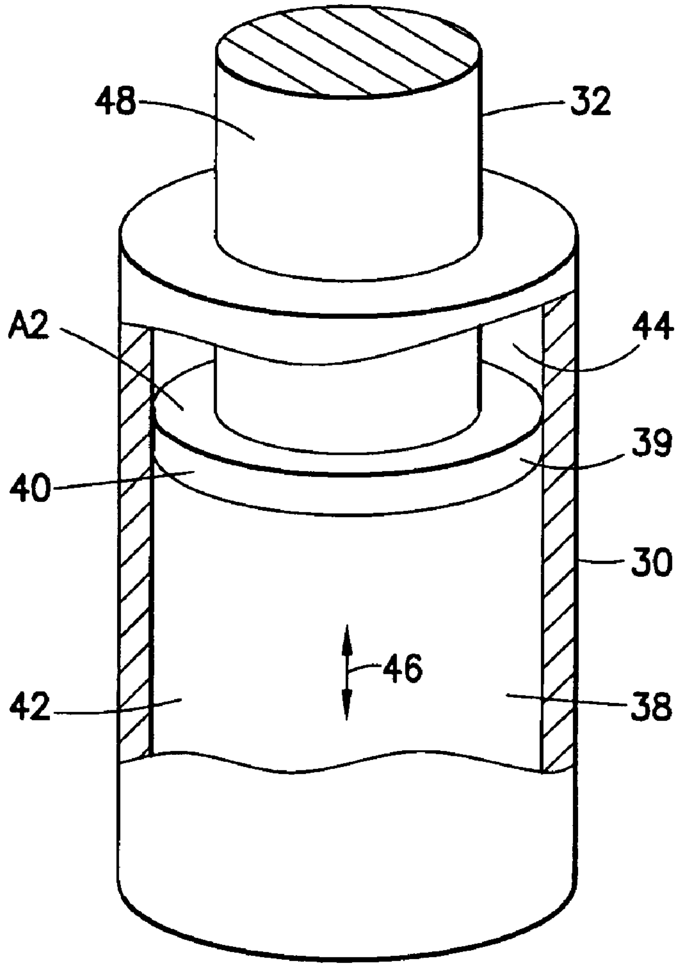
FIG. 3 is a partial cut away view of a portion of the apparatus shown in FIG. 2.

The second section 24 comprises a frame 30, a ram 32 and a gas spring section 34. The frame 30 includes a front end forming a threaded section 36 as part of the adjustable connection of the second section 24 to the first section 22. Referring also to FIG. 3, the frame 30 has a gas chamber 38. The rear end 39 of the ram 32 is located in the gas chamber 38. The rear end 39 has a piston head 40 which separates the chamber into two chambers 42, 44. The piston head 40 is slidably located in the chamber 38 to move up and down as indicated by arrow 46. The piston head 40 moves up in the chamber 38 when the ram 32 moves forward relative to the frame 30. The piston head 40 moves down in the chamber 38 when the ram 32 moves rearward relative to the frame 30. Thus, the volumes of the chambers 42, 44 can change when the piston head 40 is moved. Because of the fact that the shaft 48 of the ram 32 moves in and out of the chamber 44, the change in volumes of the two chambers 42, 44 (or at least the usable volumes in the chambers 42, 44 where gas can be located) is not equal. The size of the usable volume (in which gas can be located) in the first chamber 42 is preferably always larger than the usable volume (in which gas can be located) in the second volume 44.

Figure 6:
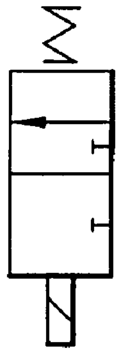
FIG. 6 is a diagram illustrating a solenoid used in the gas flow control for the gas spring shown in FIGS. 4-5.
Figure 4:
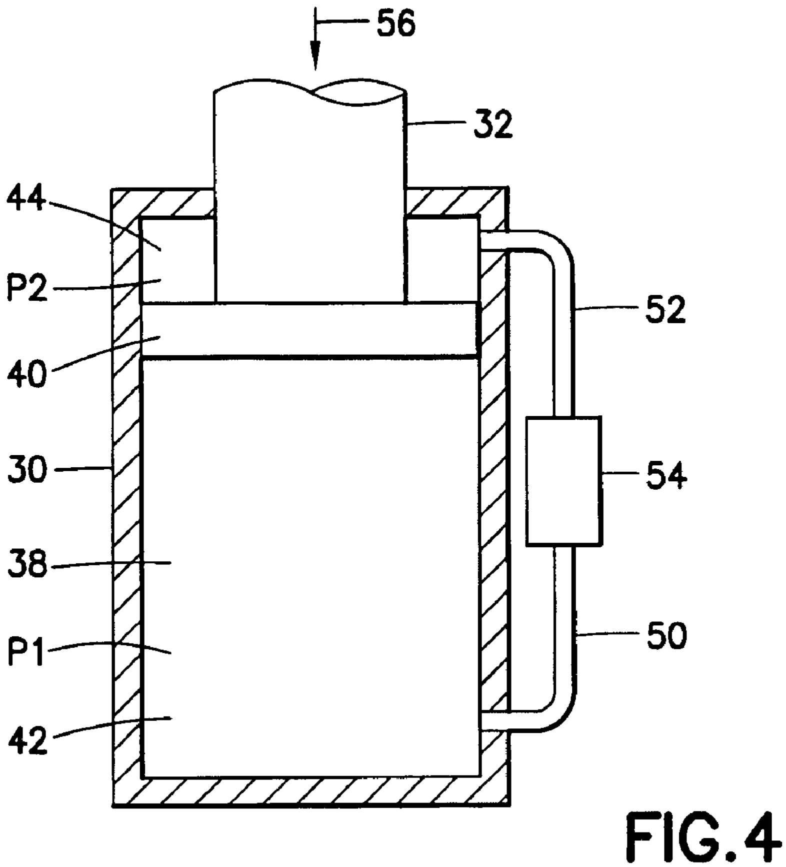
FIG. 4 is a schematic cross sectional view of the gas spring, used in the apparatus shown in FIG. 2, shown at a home extended position.

Referring also to FIG. 4, the first and second gas chambers 42, 44 are connected by conduits 50, 52 and a gas flow control 54. The conduits 50, 52 could be integrally formed in the frame 30. The gas flow control 54 is adapted to control the flow of gas, such as Nitrogen for example, through the conduits 50, 52 between the two chambers 42, 44. The gas flow control 54 could comprise a two-way solenoid, such as powered by a 24 Volt battery (not shown) for example which is connected to the frame 30. An example of the solenoid is shown in FIG. 6. However, any suitable gas flow control could be used.

Figure 5:
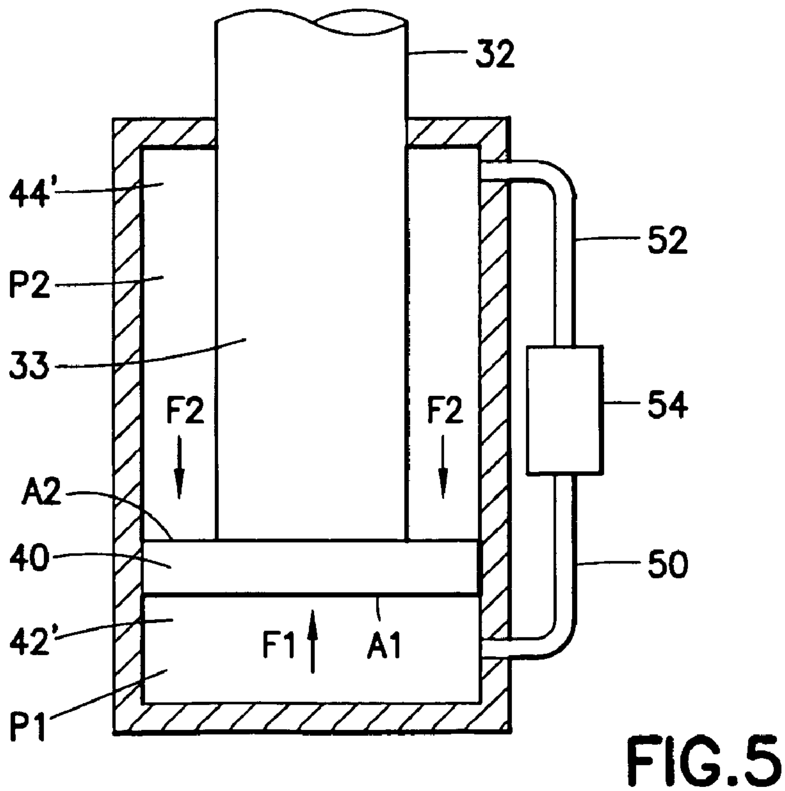
FIG. 5 is schematic cross sectional view of the gas spring as in FIG. 4 showing the gas spring at a retracted, loaded position.

FIG. 4 shows the location of the piston head 40 in the chamber 38 at a home, rest position. In this home position the valve or control 54 is open, and the gas pressure P1 in chamber 42 is equal to the gas pressure P2 in the second chamber 44. The ram 32 is substantially fully extended to its forward position. FIG. 5 shows the location of the piston head 40 in the chamber 38 at a loaded or cocked position. The loaded position comprises the ram 32 being pushed rearward into the frame 30, the piston head 40 being located further down in the chamber than at the home position shown in FIG. 4, and the valve 54 being subsequently closed.

In one method of moving the ram 32 from the home position (FIG. 4) to the loaded position (FIG. 5), a tool such as a hydraulic tool, is used to push the ram inward (in direction 56 shown in FIG. 2). For example, the hydraulic tool could be a BURNDY® PATRIOT tool. An example of a suitable type of hydraulic tool which could be used is shown in U.S. Pat. No. 6,745,611 B2, which is hereby incorporated by reference in its entirety. However, any suitable type of tool could be used. The ram 32 of the tool 20 can be moved inward by the ram of the hydraulic tool. A ram of the hydraulic tool (not shown) could be placed against surface 58, and an anvil of the hydraulic tool could be placed against the front of the ram 32.

The valve 54 is initially open when the piston head 40 is moved from its home position shown in FIG. 4 to the loaded position shown in FIG. 5. Thus, P1 continues to equal P2. As seen in comparing FIG. 4 to FIG. 5, the added insertion of the portion 33 of the ram into the chamber 44 means that pressures P1 and P2 will increase. The valve 54 is then closed. Area A1 is larger than area A2. When the valve 54 is initially closed, P1 is equal to P2. The hydraulic loading tool is then removed. When the hydraulic loading tool is removed, the force F1 (being larger than the force F2) will cause the piston head 40 to move slightly back towards the home position (reverse to direction 56). Because the valve 54 is closed, there is nowhere for the gas in 44' to go, so the pressure P2 increases and the pressure P1 reduces slightly until the forces F1 and F2 equalize.

The hydraulic tool (not shown) can then be removed after the ram 32 has been pressed inward to the loaded position (FIG. 5) and after the control or valve 54 is closed. The tool 20 can be used to connect an electrical wedge connector (see 12 in FIG. 1) to conductors (see 14, 15 in FIG. 1). The tool 20 allow very rapid movement of the ram 32 from the loaded position shown in FIG. 5 to the home position shown in FIG. 4; relative to movement of the ram of the hydraulic tool. This rapid movement of the ram 32 from the loaded position to the home position insures proper installation of the connector wedge 16 into the wedge connector sleeve 17.

Referring particularly to FIGS. 4 and 5, the chambers 42', 44' and piston head 40 form a gas spring. Release of this gas spring from the loaded position shown in FIG. 5 to the unloaded position shown in FIG. 4 is controlled by the gas flow control 54. A user can actuate or open the gas flow control 54 by a button 60 (see FIG. 2). However, any suitable user control could be provided. In the unloaded position shown in FIG. 4, the pressure P2 in chamber 44 is equal to the pressure P1 in chamber 42. When the ram 32 is moved inward in direction 56, piston head 40 pushes gas from chamber 42, through the conduits 50, 52 and control 54, into the chamber 44. When the valve 54 is subsequently closed, and the hydraulic loading tool removed, this causes the gas in chamber 44' shown in FIG. 5 to become pressurized such that P2 is larger than the pressure P1 in chamber 42'. Control 54 keeps that pressure differential until the user actuates the button 60.

Once the user actuates the button 60, the control 54 allows the gas in chamber 44' to quickly flow through the conduits 50, 52 into chamber 42'. The pressures P1 and P2 quickly move towards equalization. Area A1 is larger than area A2. The different areas and pressure changes cause the force F1 to become greater than force F2. The force differential causes the piston head 40 to move upward quickly in a direction reverse to direction 56. This drives the ram 32 outward. Because area A1 is larger than area A2, the force F1 is much larger than the force F2 and the ram movement can be very fast. Assuming the ram 32 is located against the wedge 16, the wedge 16 can be quickly driven by the ram 32 into the sleeve 17 without use of a powder cartridge as in the prior art.

Figure 7:
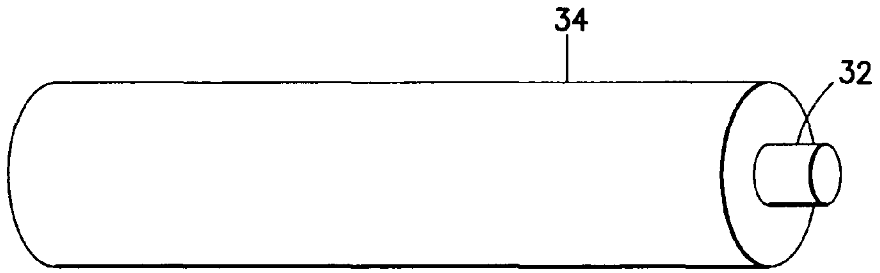
FIG. 7 is perspective view illustrating a compressed state of the ram in the gas spring.
Figure 8:
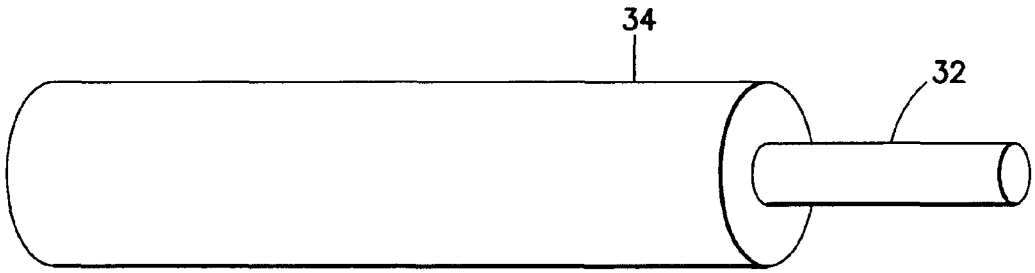
FIG. 8 is a perspective view illustrating an extended state of the ram of the gas spring.
Figure 9:
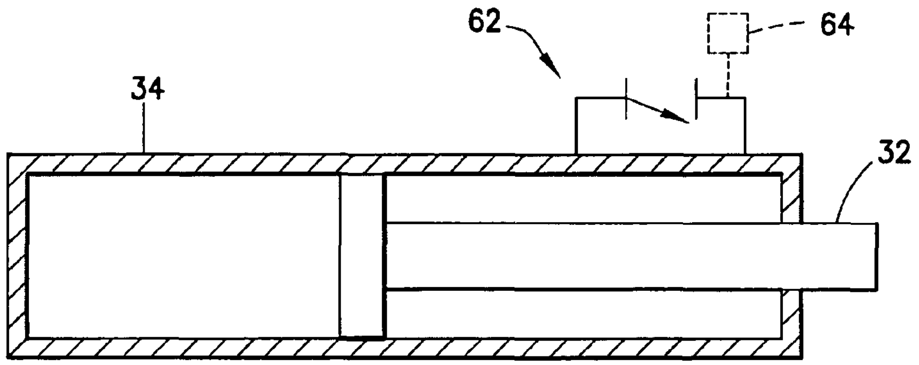
FIG. 9 is a schematic cross sectional view illustrating a check valve to atmosphere or alternatively connected to a Nitrogen reservoir.

Referring also to FIGS. 7 and 8, an embodiment of the invention can comprise a gas spring actuator 34 which can form a cylinder, such as filled with Nitrogen, to store energy that will act upon the wedge of a wedge connector to achieve high force and high velocity. FIG. 7 shows the ram 32 in a retracted position; the Nitrogen being compressed in the gas spring creating stored energy with the pressurized Nitrogen. FIG. 8 shows the ram 32 in an extended position after the gas spring has been released; driving the ram 32 forward by use of the pressurized Nitrogen. FIG. 9 shows that a check valve 62 can be used to vent gas to atmosphere, or alternatively connected to a nitrogen reservoir 64.

Figure 10:
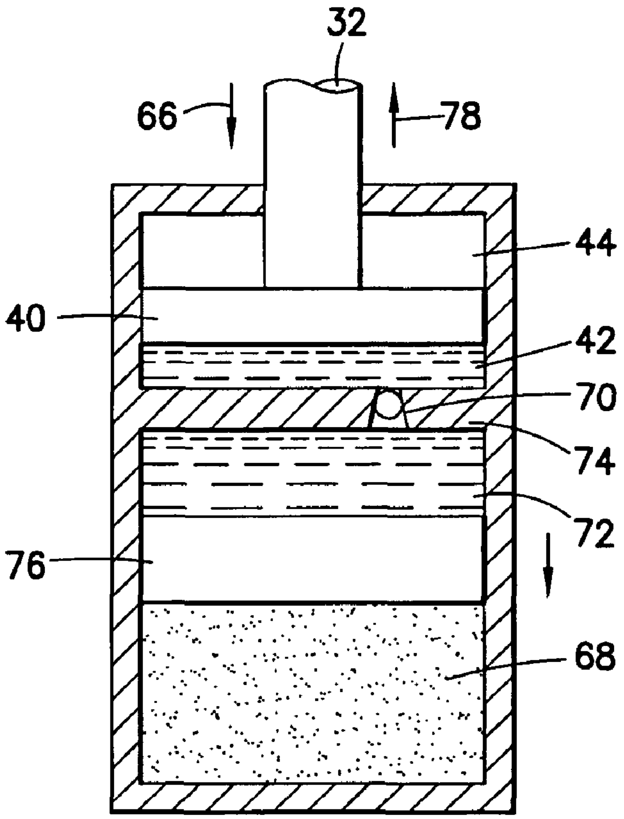
FIG. 10 is a schematic cross sectional view of an alternate embodiment of the invention.

FIG. 10 shows another embodiment which uses both gas and liquid. This is an oil over gas type of embodiment. Depression of the upper piston 40 as indicated by arrow 66 compresses the gas in chamber 68 and pushes the liquid (such as oil for example) through check valve 70 from chamber 42 to chamber 72. The frame ahs a stationary wall 74 between the chambers 42, 72. A second piston 76 is provided between the two chambers 68, 72. Depression of the upper piston 40 compresses the gas and pressurizes the liquid. Upon release of the check valve 70, the liquid flow actuates travel of the ram 32 forward as indicated by arrow 78 for its working stroke.

Figure 11:
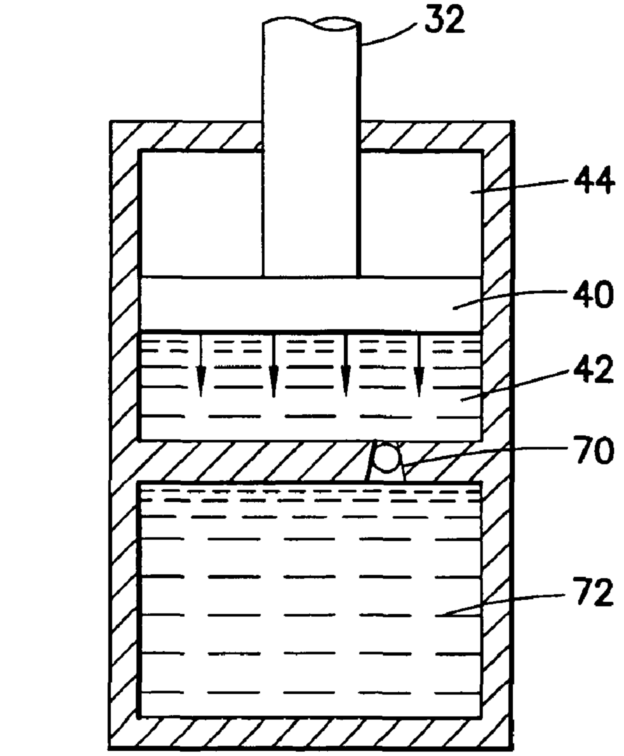
FIG. 11 is a schematic cross sectional view of another alternate embodiment of the invention.

FIG. 11 shows another embodiment substantially identical to the embodiment shown in FIG. 10, except the gas flow occurs through the check valve 70 and there is no second piston. This is a gas-over-gas embodiment which does not have a liquid.

In an embodiment of the invention, the parts of a wedge connector installation tool can consist of a Nitrogen gas spring, a solenoid and/or check valve, and a housing (such as a housing adapted to be connected to a hot stick). This eliminates the powder booster cartridge and replaced the fired-on application eliminating explosive components. The tool can be compressed by a hydraulic tool, such as a 6 or 12 ton PATRIOT tool or equivalent for example, then activated by the solenoid and/or check valve to provide the stroke to insert the wedge into the sleeve to complete the connection.

With the invention, a connector installation apparatus 20 can be provided comprising a frame 22, 24 comprising an anvil section 28, wherein the anvil section 28 is adapted to have a first connector part 17 located at the anvil section 28; a ram 32 movably connected to the frame, wherein the ram 32 comprises a front section adapted to have a second connector part 16 located at the front section; and a gas spring 34 comprising a piston head 40 on a rear end of the ram 32 and a portion 24 of the frame forming two variable chambers 42, 44 with the piston head. The gas spring can comprise a gas conduit 50, 52 connected between the two chambers 42, 44 and a gas flow control 54 in the conduit which is configured to at least partially control flow of gas between the two chambers. A user actuator 60 can be connected to the gas flow control 54 which is adapted to allow a user to actuate the gas flow control. The gas flow control 54 can comprise a solenoid (see FIG. 6). The frame can comprises a first section 22, having the anvil section 28, movably connected to a second section 24 forming the portion of the frame which forms the two variable chambers with the piston head. The first section 22 of the frame can be adjustably movable with the second section 24 of the frame by a threaded connection 26. The gas spring can comprise a second piston head 76 forming two additional variable chambers 68, 72 in the frame. A liquid is located in two of the variable chambers 42, 72. The frame comprises a stationary wall 74 between the two of the variable chambers, and the apparatus can further comprises a check valve 70 in the stationary wall. The frame comprises a stationary wall 74 between a first one of the chambers and a third chamber of the frame, wherein a check valve 70 is provided in the stationary wall between the first chamber and the third chamber. Air can be located in a second one of the chambers and an inert gas can be located in first and third chambers.

With the invention, a connector installation apparatus 20 can be provided comprising a frame 22, 24 comprising an anvil section 28, wherein the anvil section is adapted to have a first connector part 17 located at the anvil section; and a ram 32 movably connected to the frame, wherein the ram 32 comprises a front section adapted to have a second connector part 16 located at the front section, wherein the ram can comprise a piston head 40 forming two variable chambers 42, 44 in the frame, and wherein a conduit 50, 52 and a gas flow control 54 connect the two chambers 42, 44 to each other to control movement of gas between the two chambers and movement of the ram relative to the frame.

With the invention, a method can be provided comprising moving a ram 32 of a connector installation tool 20 from a first extended position to a second retracted position in a frame 22, 24, wherein gas from a first chamber 42 is compressed into a second chamber 44 by a piston head 40 of the ram; locating two connector pieces 16, 17 of a connector between a front end of the ram 32 and an anvil section 28 of the frame; and allowing the gas to move from the second chamber 44' back to the first chamber 42' to thereby drive the ram 32 forward and move a first one of the connector pieces 16 into a second one of the connector pieces 17.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A connector installation apparatus comprising:

a frame comprising an anvil section, wherein the anvil section is adapted to have a first connector part located at the anvil section;

a ram movably connected to the frame, wherein the ram comprises a front section adapted to have a second connector part located at the front section; and a gas spring comprising a piston head on a rear end of the ram, and the piston head and a portion of the frame forming two variable chambers of the gas spring.

2. An apparatus as in claim 1 wherein the gas spring comprises a gas conduit connected between the two chambers and a gas flow control in the conduit which is configured to at least partially control flow of gas between the two chambers.

3. An apparatus as in claim 2 further comprising a user actuator connected to the gas flow control which is adapted to allow a user to actuate the gas flow control.

4. An apparatus as in claim 2 wherein the gas flow control comprises a solenoid.

5. An apparatus as in claim 1 wherein the frame comprises a first section, having the anvil section, movably connected to a second section forming the portion of the frame which forms the two variable chambers with the piston head.

6. An apparatus as in claim 5 wherein the first section of the frame is adjustably movable with the second section of the frame by a threaded connection.

7. An apparatus as in claim 1 wherein the gas spring further comprises a second piston head forming two additional variable chambers in the frame.

8. An apparatus as in claim 7 wherein a liquid is located in two of the variable chambers.

9. An apparatus as in claim 8 wherein the frame comprises a stationary wall between the two additional variable chambers, and the apparatus further comprises a check valve in the stationary wall.

10. An apparatus as in claim 1 wherein the frame comprises a stationary wall between a first one of the chambers and a third chamber of the frame, wherein a check valve is provided in the stationary wall between the first chamber and the third chamber.

11. An apparatus as in claim 10 wherein air is located in a second one of the chambers and an inert gas is located in the first and third chambers.

12. A connector installation apparatus comprising:

a frame comprising an anvil section, wherein the anvil section is adapted to have a first connector part located at the anvil section; and a ram movably connected to the frame, wherein the ram comprises a front section adapted to have a second connector part located at the front section, wherein the ram comprises a piston head forming two variable chambers in the frame, and wherein a conduit and a gas flow control connect the two chambers to each other to control movement of gas between the two chambers and movement of the ram relative to the frame.

13. An apparatus as in claim 12 further comprising a user actuator connected to the gas flow control which is adapted to allow a user to actuate the gas flow control.

14. An apparatus as in claim 12 wherein the gas flow control comprises a solenoid.

15. An apparatus as in claim 12 wherein the frame comprises a first section, having the anvil section, movably connected to a second section forming the two variable chambers with the piston head.

16. An apparatus as in claim 15 wherein the first section of the frame is adjustably movable with the second section of the frame by a threaded connection.

17. An apparatus as in claim 12 wherein the gas spring further comprises a second piston head forming two additional variable chambers in the frame.

18. An apparatus as in claim 17 wherein a liquid is located in two of the variable chambers.

19. An apparatus as in claim 18 wherein the frame comprises a stationary wall between the two additional variable chambers, and the apparatus further comprises a check valve in the stationary wall.

20. An apparatus as in claim 12 wherein the frame comprises a stationary wall between a first one of the chambers and a third chamber of the frame, wherein a check valve is provided in the stationary wall between the first chamber and the third chamber.

21. An apparatus as in claim 20 wherein air is located in a second one of the chambers and an inert gas is located in the first and third chambers.

* * * * *